United States Patent [19]
Rees et al.

[11] 3,890,397
[45] June 17, 1975

[54] PROCESS FOR THE PREPARATION OF 2-NAPHTHOLE FROM THE CORRESPONDING TETRALIN-1-HYDROPEROXIDE AND 1,2-DIALIN

[75] Inventors: Thomas Charles Rees, Park Forest South, Ill.; Gerald Sugerman, Allendale, N.J.

[73] Assignee: Bayer Aktiengesellschaft, Leverkusen-Bayerwerk, Germany

[22] Filed: Mar. 24, 1972

[21] Appl. No.: 237,809

[52] U.S. Cl.... 260/621 H; 260/348 C; 260/348.5 L; 260/590; 260/610 B; 260/618 H; 260/668 R
[51] Int. Cl............................................. C07c 37/06
[58] Field of Search............ 260/621 H, 590, 586 B, 260/348 C, 348.5 L

[56] References Cited
UNITED STATES PATENTS

| 2,223,500 | 12/1940 | Scott et al. | 260/586 B |
| 2,462,103 | 2/1949 | Johnson | 260/590 |
| 2,595,266 | 5/1952 | Johnson | 260/590 X |
| 3,122,586 | 2/1964 | Berndt et al. | 260/586 B |
| 3,340,311 | 9/1967 | Chitwood et al. | 260/621 H |

OTHER PUBLICATIONS

Schraber et al., "Helv Chim Acta.," Vol. 50, pp. 2101–2108 (1967).

*Primary Examiner*—Leon Zitver
*Assistant Examiner*—Norman Morgenstern
*Attorney, Agent, or Firm*—Plumley & Tyner

[57] ABSTRACT

This invention relates to a process for the manufacture of 2-naphthols from naphthalenes and, more particularly, to a process for making 2-naphthols from naphthalenes which is based on the oxidation of 1,2-dihydronaphthalene with 1,2,3,4-tetrahydronaphthalene-1-hydroperoxide.

9 Claims, 1 Drawing Figure

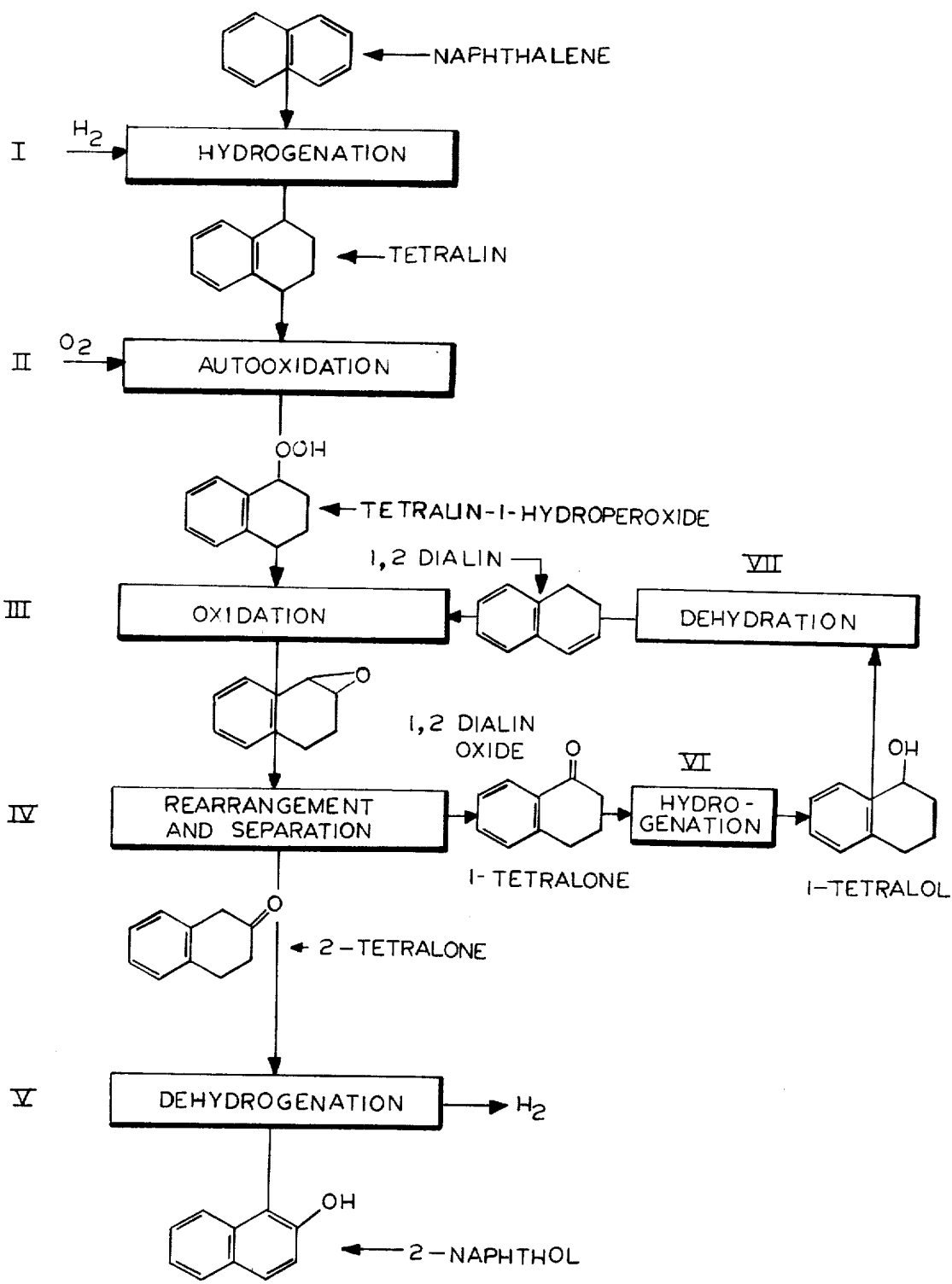

PROCESS FOR THE PREPARATION OF 2-NAPHTHOLE FROM THE CORRESPONDING TETRALIN-1-HYDROPEROXIDE AND 1,2-DIALIN

2-Naphthols, which term is intended to include not only 2-naphthol itself, but also substituted 2-naphthols, are valuable chemical intermediates because of their higher chemical reactivity in many reactions as compared to analogous 1-naphthols. 2-Naphthols have been prepared heretofore, but by processes which are inefficient and difficult to operate. The process of the present invention is based on a series of reactions which, by virtue of the overall products formed, results in a highly efficient process for the preparation of 2-naphthols. Although some of the reactions employed in the integrated process of the present invention have been described in the literature, the use of such reactions in the preparation of 2-naphthols from naphthalenes has not been known heretofore and is made possible and useful only as a result of a particular oxidation step employed in the reaction step employed in the reaction train of the present invention.

It is, therefore, an object of the present invention to provide a novel process for the manufacture of 2-naphthols.

It is a further object of the present invention to provide a novel process for the manufacture of 2-naphthols which employs naphthalenes as the starting material.

It is still another object of the present invention to provide an integrated process for the manufacture of 2-naphthols from naphthalenes, in which a naphthalene is converted to a 2-naphthol with the formation of side products which can be recirculated to the reaction train.

It is still another object of the present invention to provide an oxidation step in the manufacture of 2-naphthols from naphthalenes, which results in an integrated process for the manufacture of 2-naphthols from naphthalenes.

Other objects will become apparent from the following disclosure and claims.

The process of the present invention for the preparation of 2-naphthols from naphthalenes is based on the oxidation of a 1,2-dihydronaphthalene, hereinafter referred to as a 1,2-dialin, with a 1-hydroperoxy-1,2,3,4-tetrahydronaphthalene, hereinafter referred to as Tetralin-1-hydroperoxide, in the presence of an oxidation catalyst to result in the formation of a series of products which can be separated and either converted to 2-naphthols by dehydrogenation or form products which can be either directly recirculated to the reaction train or converted to products which can be recirculated to the reaction train.

The integrated process of the present invention as preferably applied to the manufacture of 2-naphthol, starting with naphthalene, is illustrated in the attached drawing showing the reaction train. As can be seen from the drawing, a total of seven reactions are involved. These reactions are as follows alternate, less preferred, routes are designated by A.

I. The hydrogenation of naphthalene to 1,2,3,4-tetrahydronaphthalene, hereinafter referred to as Tetralin.
II. The autooxidation of Tetralin to Tetralin-1-hydroperoxide.
III. The oxidation of 1,2-dialin with the Tetralin-1-hydroperoxide to form 3,4-dihydro-1,2-epoxynaphthalene, hereinafter referred to as 1,2-dialin oxide; 3,4-dihydro-2-(1H)-naphthalenone, hereinafter referred to as 2-tetralone; 3,4-dihydro-1-(2H)-naphthalenone, hereinafter referred to as 1-tetralone; and 1-hydroxy-1,2,3,4-tetrahydronaphthalene, hereinafter referred to as 1-tetralol.
IV. The rearrangement of 1,2-dialin oxide to tetralones, predominately 2-tetralone.
V. The dehydrogenation of 2-tetralone to 2-naphthol and naphthalene.
VI. The hydrogenation of 1-tetralone to 1-tetralol.
VII. The dehydration of 1-tetralol to 1,2-dialin for reuse in III.

It is to be understood that with the exception of the oxidation reaction, various modifications are possible. Thus, the hydrogenation of 1-tetralone can be optionally combined with the dehydration of 1-tetralol in a single reaction. Conversely, the dehydrogenation of 2-tetralone (V) can be optionally broken down into V-A-1 the hydrogenation of 2-tetralone to 2-tetralol, and then V-A-2 the dehydrogenation of 2-tetralol to 2-naphthol.

Generally, it is possible to proceed from the oxidation products III to 2-naphthol product by various techniques. It is preferred to remove 1,2-dialin oxide from these products before treating it further and this is effected in preferred step IV from which 2-tetralone is recovered from 1-tetralone by distilling. The replacement of epoxidized olefin with material derivable from (hydroperoxide source) epoxidation coproduct thereby eliminates the necessity for either external disposal or reduction to hydroperoxide feedstock of coproduct alcohol. It is, however, possible to avoid this preliminary separation of 2-tetralone and 1-tetralone, and the mixed tetralones can be dehydrogenated followed by distillation to remove 2-naphthol from 1-naphthol.

However, a deviation here is also possible to avoid removal of 1,2-dialin oxide. In this step, the mixture from III or IV is hydrogenated to yield 1- and 2-tetralol which is then selectively dehydrated to convert 1-tetralol to 1,2-dialin. 2-tetralol is readily separated from 1,2-dialin and can then be dehydrogenated to 2-naphthol.

Still further, it is possible but economically not practical to directly remove 2-tetralone from the products III by vacuum distillation (omit IV) and dehydrogenate it to 2-naphthol.

The hydrogenation of naphthalene to Tetralin of a quality useful in the integrated process of the present invention can be effected by a variety of techniques including liquid and vapor phase catalytic hydrogenation as exemplified by the methods disclosed in Belgian Pat. No. 681,620 or in the book entitled "Catalysis" by Emmet, Vol. 5, Reinhold Publishing Company, 1957. In general, vapor phase hydrogenation using a chromite, tungstate, molybdate, palladium, or Raney nickel catalyst is preferred.

The autooxidation of Tetralin to Tetralin-1-hydroperoxide is similarly known in the art, such as is disclosed in British Pat. No. 745,128 or U.S. Pat. No. 2,454,804, and is preferably conducted at temperatures of 70°–130°C with a gas containing molecular oxygen and preferably a gas such as air. Although no catalyst need be employed, the reaction is preferably conducted in the presence of an acid-binding agent and 1% or less, based on the starting material, of a catalyst which is an oil-soluble salt of a heavy metal such as cerium, iron, lead, copper, cobalt, nickel, manganese, or the like. The reaction is conducted preferably such that a conversion of about 30-45% is obtained. Separation of the Tetralin-1-hydroperoxide from unreacted Tetralin can be achieved by various methods, such as crystallization at a temperature on the order of 0°C, or by removal of unconverted Tetralin through vacuum distillation at temperatures below 100°C and preferably below 60°C.

The peroxidation of dialin with Tetralin-1-hydroperoxide to the reaction products shown in the attached drawing is preferably conducted with an excess of 1,2-dialin being present, and preferably with a mole ratio of the Tetralin-1-hydroperoxide to the 1,2-dialin of 1:1.5 to 1:5. In order to obtain a distribution of oxidation products which is useful in an integrated process, the oxidizing agent, i.e., the hydroperoxide, must have the same chemical structure as the material to be oxidized, with the exception of the 1- and 2- positions, in that the oxidizing agent contains the hydroperoxide group at the 1-position and is saturated at the 1,2-position, and in that the material to be oxidized contains an unsaturated linkage in the 1,2-position and, of course, no hydroperoxide group. The reaction is generally conducted in the liquid phase in the presence or absence of inert solvents at temperatures of −20°C to about 150°C, and preferably at 0° to 100°C., in the presence of an oxidation catalyst. The oxidation catalyst employed in this step of the process comprises the soluble compounds of the transition metals in Groups IV B, V B, VI B, VII B, and VIII of the Periodic Table of Elements as published on page B-2 of the Handbook of Chemistry and Physics, 45th Edition, by the Chemical Rubber Company. The catalysts include such compounds as Ti, V, Cr, Se, Zr, Nb, Mo, Te, Ta, W, Re and U. The preferred metal compounds are those of vanadium, molybdenum, rhenium, tungsten, tantalum and titanium.

The transition metal can be employed in any form which will allow solubilization of the transition metal in the reaction mixture to the degree necessary to catalyze the peroxidation. Since the catalyst can be employed in concentrations as low as 0.00001 mole per mole of the hydroperoxide, a large variety of the transition metal compounds are suitable as catalysts in the present invention. Although transition metal halides and oxides are suitable catalysts, it is in general preferred to employ compounds of transition metals in which the transition metal is bonded to an organic radical. Thus, preferred compounds are transition metal organic salts such as naphthenates, stearates, octoates; transition metal carbonyls; and transition metal chelates such as, for example, acetylacetonates. The most preferred group of catalysts comprises the organic salts, chelates, and carbonyls of molybdenum.

The course of the reaction and the distribution of products can be altered by the addition of either basic or acidic substances. In order for such to be effective, it is, however, in general preferred to employ acidic or basic substances which are soluble, to the extent such are used in the reaction mixture. Suitable basic materials include the carbonates and phosphates as well as hydroxides, oxides, and alkoxides of the alkali and alkaline earth metals. Suitable acidic compounds include organic acids such as acetic, propionic, and butyric acid, and their acidic salts. The amount of such catalyst additives will vary greatly, but is generally in the range of 0.0001 to 10 moles per mole of the oxidation catalyst.

The peroxidation of 1,2-dialin with tetralin-1-hydroperoxide results in the formation of, principally, 2-tetralone, 1,2-dialin oxide, 1-tetralol, and 1-tetralone. The conversion and the product distribution of the peroxidation reaction can be adjusted by judicious choice of temperatures and catalysts. Efficiencies of 85% of the tetralin-1-hydroperoxide used to form 1,2-dialin oxide and 2-tetralone, which are the precursors for the formation of 2-naphthol, giving rise to 99% or more of the 2-naphthol precursor, can be achieved. Although the tetralin-1-hydroperoxide itself decomposes to form, principally, 1-tetralol with small amounts of 1-tetralone, the 1,2-dialin forms the desired naphthol precursors. However, in view of the integrated nature of the process of the present invention, it is not essential that such high yields of the naphthol precursors are obtained, since the by-products formed from the oxidation can be recirculated to the process. The products formed by the peroxidation of 1,2-dialin withh the hydroperoxide are separated before dehydrogenation.

In the illustrated, preferred embodiment, the naphthol precursor, comprising 1,2-dialin oxide and 2-tetralone, is converted to 2-tetralone which is dehydrogenated to 2-naphthol. Naphthalene and minor amounts of Tetralin can be recovered from the distillation of the dehydrogenation product and recycled to the reaction train. In addition, unreacted 2-tetralone and 2-tetralol are recovered. The latter two compounds can be recirculated to the dehydrogenation for conversion to 2-naphthol.

After conversion of 1,2-dialin oxide to 2-tetralone, dehydrogenation can be accomplished as stated above. The dialin oxide is catalytically rearranged to 2-tetralone using strong or weak acid catalysts, e.g., $H_2SO_4$, acetic acid, methane sulfonic acid or basic materials as defined above. This catalyst need not be added if used in the oxidation stage but it will increase efficiency if some is added in any case. The 2-tetralone can then be subsequently distilled or separated for direct dehydrogenation to the 2-naphthol or the rearrangement mixture can be hydrogenated to form 1- and 2-tetralol as in V-A-1-2. In this latter case the 2-tetralol is then dehydrogenated to 2-naphthol.

Instead of rearrangement as illustrated, direct hydrogenation followed by selective dehydration of 1-tetralol to 1,2-dialin can occur whereupon the 2 tetralol can be separated by distillation from the 1,2-dialin more readily. The 1,2-dialin is returned to the oxidation step as done previously.

The direct dehydrogenation of the precursor 2-tetralone to 2-naphthol can be conducted in either the liquid phase at temperatures up to 200°C., or in the vapor phase at temperatures of 200°-500°C. in the presence of typical dehydrogenation catalysts and optionally, in the presence of a hydrogen acceptor such as naphthalene which forms Tetralin, which similarly can be reemployed in the process. Catalysts which are useful in the dehydrogenation of the precursor include palladium catalysts, platinum catalysts, and nickel catalysts. Particularly preferred is a platinum-on-alumina catalyst. These catalysts are well-known in the art and are used in the process of the present invention in accordance with the procedures developed for these catalysts.

The two-step process described hereinabove as an alternate way of preparing the 2-naphthol from the naphthol precursor involving the intermediate formation of 2-tetralol, can be conducted according to hydrogenation and dehydrogenation techniques disclosed in the literature. Preferably, the dehydrogenation of 2-tetralol to 2-naphthol is accomplished using a copper chromite catalyst such as described in the J.A.C.S., Volume 63, page 741 (1941). In addition to 2-naphthol, naphthalene and some Tetralin are formed which can be recirculated to the integrated process of the present invention.

The 1-tetralone formed as a side product in the peroxidation reaction of 1,2-dialin with the Tetralin-1-hydroperoxide is hydrogenated to 1-tetralol using a palladium catalyst in accordance with procedures heretofore developed. The 1-tetralol obtained in this manner is combined with the 1-tetralol also formed in the oxidation reaction, and is dehydrated to 1,2-dialin in the liquid phase at temperatures of 150°–350°C using transition metal catalysts such as are employed in the above-described peroxidation reaction, or is dehydrated by a vapor phase dehydration over alumina or phosphate catalysts, and preferably an aluminum phosphate catalyst, at temperatures of 200°C to about 400°C. It is to be noted that since the formation of 1,2-dialin in the liquid phase involves the same catalysts are as used in the peroxidation, it is feasible to directly employ the reaction mixture, after removal from the reaction mixture of 2-tetralone, 1,2-dialin oxide and unreacted 1,2-dialin, to convert such remainder to 1,2-dialin by heating to the temperatures which cause dehydration. The 1,2-dialin formed by this reaction is recirculated to the process as indicated on the flow sheet in the drawing.

Although the foregoing description of the integrated process of the present invention has been described in terms of the manufacture of 2-naphthol from naphthalene, it is to be understood that lower alkyl-substituted naphthalenes, lower alkoxy-substituted naphthalenes, and halogen-substituted naphthalenes which contain at least one unsubstituted beta position, can be converted to substituted 2-naphthols using the described process train.

The process of the present invention is further illustrated by the following examples in which all parts and percentages are by weight unless otherwise stated.

EXAMPLE 1

This example illustrates all of the reactions employed in the integrated process of producing 2-naphthols from naphthalene.

I The Hydrogenation of Naphthalene to Tetralin

A mixture of naphthalene and hydrogen in a volumetric ratio of 1:19 is passed over a copper chromite catalyst commercially available as Harshaw Ni-0116T 1/8, under a pressure of 150 psig, at a temperature of 250°C using an hourly space velocity of about 0.2. Approximately 97% of the naphthalene is converted to Tetralin (1,2,3,4-tetrahydronaphthalene).

II The Peroxidation of Tetralin to Tetralin-1-Hydroperoxide

Into a two-liter flask equipped with a "Vibromixer" agitator sparger is charged about 1,000 g of Tetralin. The Tetralin is heated to 115°C and oxygen at atmospheric pressure is passed through the tetralin for a period of one hour. The reaction product is passed to a refrigerated crystallizer-centrifuge unit from which 322 g of Tetralin-1-hydroperoxide of about 93% purity and 763 g of unreacted Tetralin is recovered, which is recirculated.

III Oxidation of 1,2-Dialin

A 1-liter glass flask equipped with a mechanical stirrer and thermometer is charged with a solution of 0.4 millimoles of molybdenyl acetylacetonate in 3.0 moles of 1,2-dialin (1,2-dihydronaphthalene). The flask is placed in a 25°C constant temperature bath. Tetralin-1-hydroperoxide (1-hydroperoxy-1,2,3,4-tetrahydronaphthalene THP), 1.0 mole, is added to the reaction mixture and the resulting solution is stirred for 18 hours. Analysis of the resulting reaction mixture by standard iodometric techniques shows that about 98% of the hydroperoxide reacts. Vapor phase chromatography of the reaction product shows that 30% of the dialin is reacted. The distribution of products obtained is as follows:

| | |
|---|---|
| 1-Tetralone (3,4-dihydro-1-(2H)-naphthalenone) | 6% based on THP |
| 1-Tetralol (1-hydroxy-1,2,3,4-tetrahydronaphthalene) | 93% based on THP |
| An unresolved mixture of 1,2-dialin oxide and 2-tetralone (3,4-dihydro-1,2-epoxynaphthalene and 3,4-dihydro-2-(1H)-naphthalenone) | 99% based on 1,2-dialin reacted |

IV The Rearrangement of 1,2 Dialin Oxide to Tetralones Predominantly 2-Tetralone To the flask is added dropwise 0.1 mole of concentrated $H_2SO_4$ and after standing a few hours, the reaction mixture is separated into 1,2-dialin, 1-tetralone, 1-tetralol and 2-tetralone.

IV—A

As an alternative route it is possible to by-pass the rearrangement (removal) of 1-2 dialin oxide (IV).

V Dehydrogenation of 1,2-Dialin Oxide and 2-Tetralone

Into a 250 ml. flask is charged 0.3 mole of the mixture of 1,2 dialin oxide and 2-tetralone, IV-A, or the product 2-tetralone from IV and 5 g of a 5% platinum-on-alumina catalyst. The flask is immersed in a 100°C. constant temperature bath and vigorously agitated for a period of four hours. Analysis of the reaction product by vapor phase chromatography shows the following product distribution: (based on dehydrogenation after IV-A)

| | |
|---|---|
| 2-Tetralone | 4% |
| 2-Naphthol | 57% |
| 2-Tetralol | 28% |
| Naphthalene | 8% |

VI Hydrogenation of 1-Tetralone to 1-Tetralol

1-Tetralone removed from the products of steps IV or IV-A is hydrogenated at a pressure of 50 psig and ambient temperatures using 1% by weight of the 1-tetralone of a 5% palladium-on-carbon catalyst. The reaction product is filtered and fractionated to result in the formation of 93% of 1-tetralol and 4% Tetralin, the remainder being unreacted 1-tetralone.

VII Dehydration of 1-Tetralol to 1,2-Dialin

A mixture of hydrogen and 1-tetralol in a volumetric ratio of 10:1 is vaporized and passed over an aluminum

EXAMPLES 13 TO 20

These examples illustrate the effect of catalysts and temperature on the conversion of 2-tetralone and 1,2 dialin oxide to 2-naphthol, via V.

Using the procedure of Example I-V, wherein the mixture of 1,2 dialin oxide and 2-tetralone obtained by the procedure of Example 1-IV-A is dehydrogenated under the conditions set forth in Table III. The results obtained are similarly shown in the Table.

TABLE III

| Example | Catalyst | Reaction Temperature (°C) | Reaction Time (hrs) | Conversion of 1,2-dialin oxide and 2-tetralone (%) | 2-Naphthol Selectivity (Mole %) |
|---|---|---|---|---|---|
| 13 | 5% Palladium-on-carbon | 100 | 4 | 40 | 48 |
| 14 | 5% Palladium-on-carbon | 200 | 4 | 67 | 40 |
| 15 | 5% Palladium-on-calcium carbonate | 100 | 4 | 52 | 62 |
| 16 | 5% Palladium-on-calcium carbonate | 200 | 4 | 81 | 31 |
| 17 | 5% Platinum-on-carbon | 100 | 4 | 54 | 30 |
| 18 | 5% Platinum-on-carbon | 200 | 4 | 67 | 24 |
| 19 | 5% Platinum-on-alumina | 200 | 4 | 99+ | 28 |
| 20 | None | 200 | 4 | ~2 | <5 | phosphate catalyst, commercially available as Girdler T 1134-1/8, at temperatures of 300° to 330°C at an hourly space velocity of about 4. The resulting product contains 95% of dialin, the remainder being essentially unreacted 1-tetralol as established by vapor phase gas chromatography.

EXAMPLES 2 TO 5

These examples illustrate the effect of catalyst variation on the oxidation of dialin, III.

Following the procedure of Example 1-III, Tetralin-1-hydroperoxide and 1,2-dialin are reacted using the catalysts and conditions set forth in Table I. The results obtained are similarly shown in the Table.

EXAMPLE 21

This example illustrates the use of a soluble molybdenum compound as the catalyst for the dehydration of 1-tetralol to 1,2-dialin (VII).

The reaction product of Example 1-IV is vacuum distilled to separate out dialin, 1-tetralone and 2-tetralone. The pressure on the distillation flask is then raised to 200 mm Hg and the temperature is increased to the distillation temperature of 1,2-dialin at that pressure. The reaction is conducted until no further dialin is distilled. A 97% yield of 1,2-dialin, based on the 1-tetralol present, is obtained.

TABLE I

| Example | Catalyst | Reaction Temperature (°C) | Reaction Time (hrs) | THP Conversion (%) | Conversion of Dialin to 2-tetralone and 1,2-dialin oxide (%) |
|---|---|---|---|---|---|
| 2 | Rhenium oxide | 25 | 4 | 99 | 16 |
| 3 | Tungsten carbonyl | 100 | 4 | 46 | 31 |
| 4 | Vanadyl acetylacetonate | 25 | 4 | 97 | 62 |
| 5 | None | 100 | 4 | 23 | 7 |

EXAMPLES 6 TO 12

These examples illustrate the effect of temperature and catalyst concentration on the oxidation of 1,2-dialin, III.

Following the procedure of Example 1-III, Tetralin-1-hydroperoxide and 1,2-dialin are reacted using molybdenyl acetylacetonate as the catalyst under the conditions set forth in Table II. The results obtained are similarly shown in the Table.

EXAMPLE 22

This example illustrates the stepwise dehydrogenation VA-VB of the 2-naphthol precursor and the alternative IV-A to catalytic rearrangement IV.

The mixture obtained from Example 1-III, 500 g is distilled to remove 1,2-dialin, the remainder is hydrogenated to a mixture of 1-tetralol and 2-tetralol in an agitated 1 liter autoclave at 100 psi at 50°C. using 25 g of a palladium-on-carbon catalyst. After filtration of

TABLE II

| Example | Catalyst Concentration (mole % × 10⁴) | Reaction Temperature (°C) | Reaction Time (hrs) | THP Conversion (%) | Selectivity to 2-tetralone and 1,2-dialin oxide (%) |
|---|---|---|---|---|---|
| 6 | 1 | 0 | 12 | 39 | 97 |
| 7 | 1 | 50 | 2 | 95 | 68 |
| 8 | 1 | 100 | 2 | 99+ | 21 |
| 9 | 0.01 | 50 | 2 | 19 | 32 |
| 10 | 0.1 | 50 | 2 | 78 | 60 |
| 11 | 10 | 50 | 2 | 98 | 65 |
| 12 | 100 | 50 | 2 | 99+ | 54 | the catalyst, the 1-tetralol is selectively dehydrated leaving 1,2 dialin and 2 tetralol. The dehydration is conducted in an agitated autoclave by heating to 175°C. at 110 m.m. pressure in the presence of molybdenyl acetylacetonate (10 mole %) for 2 hours to give 1,2 dialin from 1-tetralol and unchanged 2-tetralol. The 1,2 dialin is again removed by distillation and recycled. The dehydrogenation of 2-tetralol to 2-naphthol is conducted at 300°C. under a nitrogen pressure of 65 atmospheres with copper chromite catalyst. A 73% yield is obtained.

EXAMPLE 23

This example illustrates the use of a hydrogen acceptor in the dehydrogenation of the 2-naphthol precursor.

Following the procedure of Example 1–V, 0.3 mole of the 1,2-dialin oxide/2-tetralone mixture from IV-A and 1.2 moles of naphthalene are employed. Instead of just naphthalene, a mixture of nahthalene and Tetralin is obtained in the reaction product in addition to the 2-naphthol, 2-tetralone and 2-tetralol.

The foregoing examples illustrate the reactions employed in the integrated process of producing 2-naphthol from naphthalene in accordance with the present invention, as well as alternate ways of conducting the reactions employed. Although some of the alternate methods do not provide equally high yields of the desired product, it is to be pointed out that in view of the utilization of the by-products formed in any of the reactions, such does not seriously affect the use of such alternate methods in integrated processes.

Similar results are obtained if, in place of the naphthalene, substituted naphthalenes such as lower alkyl-substituted naphthalenes, lower alkoxy-substituted naphthalenes or halogen-substituted naphthalenes in which there exists at least one unsubstituted beta-position, are employed in the specific procedures or by trivially altered modifications thereof, as described in the foregoing examples.

In view of the foregoing disclosure, variations and modifications of the specific embodiments described will be apparent to those skilled in the art and it is intended to include such within the scope of the present invention.

What is claimed is:

1. In a process for the preparation of 2-naphthol or a substituted 2-naphthol from Tetralin-1-hydroperoxide or the corresponding Tetralin-1-hydroperoxide and 1,2-dialin or the corresponding 1,2-dialin, the steps which comprise
    a. reacting a Tetralin-1-hydroperoxide selected from the group consisting of Tetralin-1-hydroperoxide and Tetralin-1-hydroperoxide further substituted by a member of the group consisting of lower alkyl, lower alkoxy and halogen and having at least one unsubstituted beta-position with a molar excess of the corresponding 1,2-dialin in the presence of a catalyst selected from the class consisting of the halides, oxides, carbonyls, acetyl acetonates, naphthenates and alkanoates of vanadium, molybdenum, rhenium, tungsten, tantalum and titanium at a temperature of 0° to 150° C. to produce a mixture comprising the corresponding 1,2-dialin oxide, the corresponding 2-tetralone, the corresponding 1-tetralone and the corresponding 1-tetralol;
    b. adding an acidic or basic catalyst selected from the group consisting of mineral acids, alkanoic acids, alkyl sulfonic acids, inorganic bases and alkali and alkaline earth alkoxides to catalytically rearrange said corresponding 1,2-dialin oxide to a mixture of the corresponding tetralones predominating in the corresponding 2-tetralone;
    c. separately securing by distillation of the resulting reaction mixture (b) said corresponding unreacted 1,2-dialin, said corresponding 2-tetralone, and a remainder comprising said corresponding 1-tetralone and said corresponding 1-tetralol, and
    d. dehydrogenating said corresponding 2-tetralone to the corresponding 2-naphthol by liquid or vapor phase contact at temperatures up to 500° C. with a palladium, platinium, or nickel dehydrogenation catalyst.

2. The process of claim 1 wherein said remainder from step (c) is dehydrated to the corresponding 1,2-dialin by liquid phase contact at temperatures of from 150° to 350°C. with a catalyst as defined in (a), and thereafter, recycling said 1,2-dialin to step (a).

3. The process of claim 2 wherein the dehydration step is carried out by vapor phase contact with alumina or a phosphate dehydration catalyst at 200° to 400°C.

4. The process of claim 1 wherein the corresponding 2-tetralone from (c) is hydrogenated to the corresponding 2-tetralol in the liquid phase at ambient temperatures and elevated pressures in the presence of a palladium catalyst and then (d) said corresponding 2-tetralol is dehydrogenated to the corresponding 2-naphthol by liquid or vapor phase contact at temperatures up to 500°C with a palladium, platinium or nickel dehydrogenation catalyst.

5. The process of claim 1 wherein the reaction mixture (a) is dehydrogenated to produce the corresponding 2-naphthol and the corresponding 1-naphthol by dehydrogenating said mixture by liquid or vapor phase contact at temperatures up to 500°C with a palladium, platinium or nickel dehydrogenation catalyst and then the corresponding 2-naphthol is separated from the corresponding 1-naphthol by distillation.

6. The process of claim 1 wherein the corresponding 1-tetralone and the corresponding 1-tetralol from (c) is hydrogenated in the liquid phase at ambient temperatures and elevated pressures in the presence of a palladium catlayst to yield the corresponding 1-tetralol and the corresponding 2-tetralol and the hydrogenation product is dehydrated in the vapor phase over an alumina or phosphate dehydrogenation catalyst at temperatures of 200° to about 400°C to convert the corresponding 1-tetralol to the corresponding 1,2-dialin; then the corresponding 2-tetralol is separated from the corresponding 1,2-dialin and the same corresponding 2-tetralol is dehydrogenated to the corresponding 2-naphthol by liquid or vapor phase contact at temperatures up to 500°C with a palladium, platinium or nickel dehydrogenation catalyst.

7. The process of claim 1 wherein the said hydrogenation product is dehydrogenated in the liquid phase to the corresponding 1,2-dialin at temperatures of 150° to 350°C using a transition metal catalyst selected from the group consisting of a halide, a oxide, a caronbyl, an acetyl acetonate, a naphthenate or an alkonate of vanadium, molybdenum, rhenium, tungsten tantalum or titanium.

8. The process of claim 1 wherein the reaction mixture (a) is vacuum distilled to obtain the corresponding 2-tetralone which is dehydrogenated to the corresponding 2-naphthol by liquid or vapor phase contact at temperatures up to 500°C with a palladium, platinium or nickel dehydrogenation catalyst.

9. The process of claim 1 wherein the reactant is naphthalene and the product is 2-naphthol.

* * * * *

UNITED STATES PATENT AND TRADEMARK OFFICE
CERTIFICATE OF CORRECTION

PATENT NO. : 3,890,397
DATED : June 17, 1975
INVENTOR(S) : Thomas Charles Rees et al It is certified that error appears in the above-identified patent and that said Letters Patent are hereby corrected as shown below:

Under Assignee delete "Bayer Aktiengesellschaft" and insert ---Sherwin Williams Company---.

Also delete "Leverkusen-Bayerwerk, Germany and insert ---Cleveland, Ohio---.

Column 5, line 29 and line 30, "are as" should be ---as are---.

The application for this Patent, Serial No. 237,809, filed March 24, 1972, was assigned to The Sherwin-Williams Company and was recorded in the U.S. Patent Office on May 11, 1972 on Reel 2847 Frames 181-182.

When the Base Issue Fee Transmittal Form POL 856 was filled out, the name of the Assignee was erroneously given as Bayer Aktiengesellschaft of Leverkusen-Germany. Evidently it was on the basis of this erroneous information that the incorrect Assignee was printed on the issued patent.

Signed and Sealed this sixteenth Day of March 1976

[SEAL]

Attest:

RUTH C. MASON
Attesting Officer

C. MARSHALL DANN
Commissioner of Patents and Trademarks